UNITED STATES PATENT OFFICE.

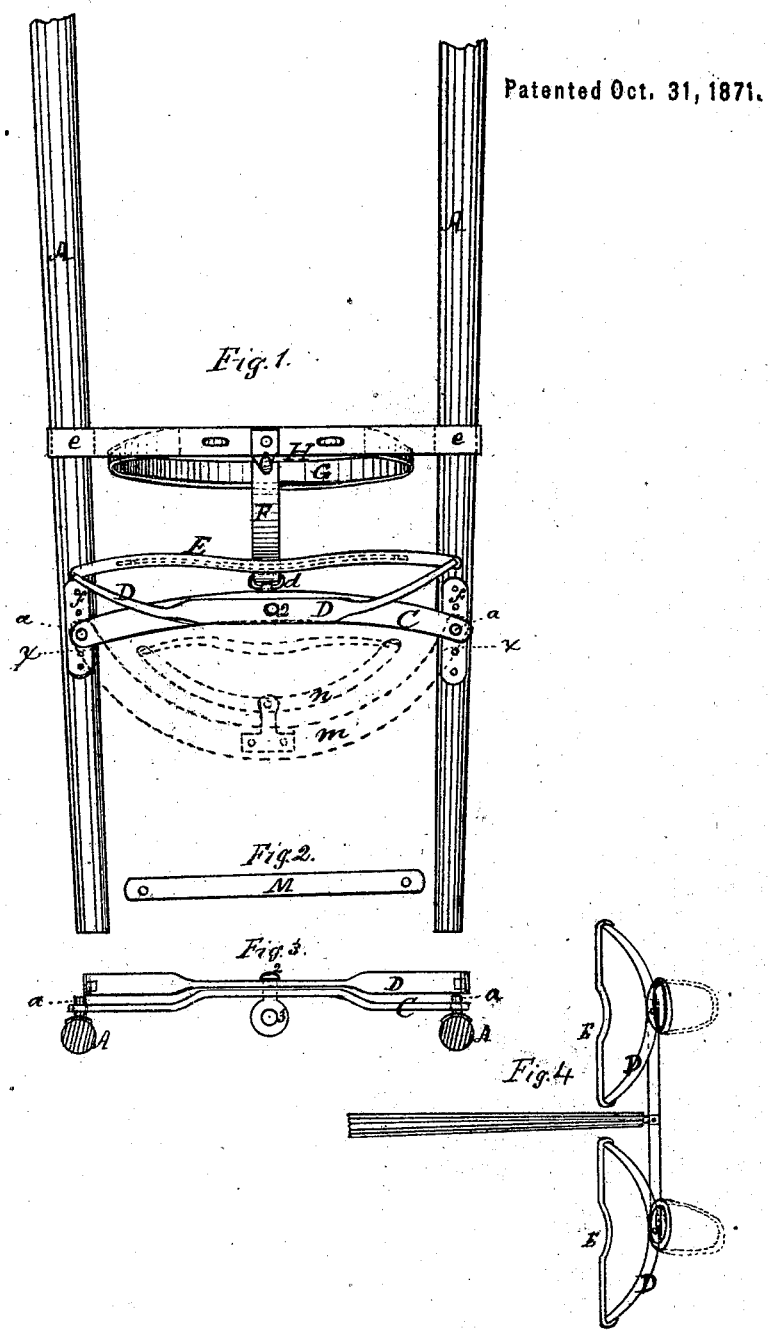

ARTHUR W. LAWTON, OF ROCHESTER, NEW YORK.

IMPROVEMENT IN HARNESS.

Specification forming part of Letters Patent No. 120,445, dated October 31, 1871; antedated October 21, 1871.

*To all whom it may concern:*

Be it known that I, ARTHUR W. LAWTON, of the city of Rochester in the county of Monroe, in the State of New York, have invented certain new and useful Improvements in Harness; and I do hereby declare that the following is a full and exact description thereof, reference being had to the accompanying drawing and to the letters of reference marked thereon.

Figure 1 represents a plan or top view of my improved breast-strap harness, and its connection with the shafts of a carriage. Fig. 2 represents a side view of the collar-plate detached. Fig. 3 represents a front view of the pivotal spring-piece or bow, the cross-piece and a sectional view of the shafts taken at the line $x\ x$ of Fig. 1. Fig. 4 represents the manner of attaching the collars to a neck-yoke of a double carriage.

Various constructions of harness for the draft of light carriages have been attempted with the purpose of securing freedom to the horse, and of relieving him from undue heat from the adhering contact of the harness; but such proposed improvements have not provided for relieving the throat of the annimal from contact and pressure of a continuous draft-strap or collar, nor furnished a pivotal connection of the collar so that it will freely adjust itself to the horse when traveling, without chafing the animal's breast and shoulders.

The object of my invention is to obviate the objections referred to, and to furnish a harness composed of few parts, and which can be quickly attached and detached, and provided with a self-adjusting collar which will allow the animal the greatest freedom of action, and which will be out of contact with the throat of the animal while at work, as well as when at rest.

In the accompanying drawing, A denotes the shafts or thills which are provided with two studs, $a\ a$, each having a spring-catch. The cross-bar C is provided with a suitable hole at each end to fit upon the studs $a\ a$, and the spring-catches of the studs will retain the bar C in place when the harness is in use. The spring-bow piece D of the collar is pivoted centrally upon the cross-bar C, so as to work freely upon its pivot like a single-tree. Suitable loops are formed upon the ends of the spring-bow piece D, to which the ends of the breast-strap E are attached. The pivot 2 with which the bow D is secured to the cross-bar C extends below the latter and terminates with a ring or loop, 3, into which the snap-catch, which is connected at $d$ with the hold-back strap F, is hooked. The hold-back strap extends back and is connected with the girth G in the usual manner. The saddle H is provided with suitable shaft-tugs or loops $e\ e$ by which the shafts are suspended. The studs $a\ a$ may be secured to the shafts by means of riveted plates $f$. The dotted lines upon the upper edge of the breast-strap E denote the metal spring collar-plate M, which is secured between two strips of leather forming the breast-strap. This plate should be made in a curved form nearly, as indicated by the dotted lines referred to, so as to give a slightly-concave inner face to the breast-strap at the middle portion thereof, and thereby relieve the draft from the throat of the animal. The plate should also be made thickest along its central portion, and gradually thinner towards its ends so as to allow the breast-strap to properly adjust itself to the shoulders of the horse. The general form of the breast-plate should conform to the shape of the breast and shoulders of the animal, with only sufficient variation at its center to relieve the throat of the animal from undue pressure by the collar when in use. Instead of the solid-metal studs $a\ a$ tubular studs may be substituted with the spring-catch secured within the tube and projecting above the open end of the tube, which may be the preferable arrangement. And a modification of the cross-bar C may be made, as indicated in the dotted lines $m$, in Fig. 1, in which construction the bow $m$ would be employed with the bow-shaped spring-piece $n$, connected by a pivot immediately within the arc of the circle of the larger bow $m$, and in rear of it. The draft against the breast-strap collar, in this case, would prevent any tendency of the spring collar-bow to bend or break the connecting pivot or the studs $a\ a$.

What I claim, and desire to secure by Letters Patent as my invention, is—

1. The cross-bar C to which the spring bow-piece D is pivoted, made removable by its connections *a* in the manner and for the purpose described.

2. The flexible or spring bow-piece D, in combination with the removable cross-bar C to which it is pivoted, and the connected cross breast-strap E, as and for the purpose described.

In testimony whereof I have hereunto set my hand.

ARTHUR W. LAWTON.

Witnesses:
 H. P. K. PECK,
 ARTHUR L. PECK. (72)